United States Patent
Xiong et al.

(10) Patent No.: US 10,637,719 B2
(45) Date of Patent: Apr. 28, 2020

(54) BUS EXCEPTION HANDING METHOD OF ROBOT AND BUS EXCEPTION HANDLING DEVICE

(71) Applicant: UBTECH Robotics Corp., Shenzhen (CN)

(72) Inventors: Youjun Xiong, Shenzhen (CN); Hailang Zhou, Shenzhen (CN); Musen Zhang, Shenzhen (CN)

(73) Assignee: UBTECH ROBOTICS CORP., Shenzhen (CN)

(*) Notice: Subject to any disclaimer, the term of this patent is extended or adjusted under 35 U.S.C. 154(b) by 192 days.

(21) Appl. No.: 15/694,872

(22) Filed: Sep. 4, 2017

(65) Prior Publication Data
US 2018/0191555 A1 Jul. 5, 2018

(30) Foreign Application Priority Data
Dec. 30, 2016 (CN) .......................... 2016 1 1253336

(51) Int. Cl.
| | | |
|---|---|---|
| *H04L 12/24* | (2006.01) | |
| *H04L 12/40* | (2006.01) | |
| *H04L 29/08* | (2006.01) | |
| *B25J 9/16* | (2006.01) | |
| *H04L 12/12* | (2006.01) | |

(52) U.S. Cl.
CPC ........ *H04L 41/0672* (2013.01); *B25J 9/1674* (2013.01); *H04L 12/12* (2013.01); *H04L 12/40* (2013.01); *H04L 12/40039* (2013.01); *H04L 67/125* (2013.01); *H04L 2012/40215* (2013.01)

(58) Field of Classification Search
None
See application file for complete search history.

(56) References Cited

U.S. PATENT DOCUMENTS

| | | | | | |
|---|---|---|---|---|---|
| 5,491,395 | A | * | 2/1996 | Hutsell ................. | G11B 19/00 318/560 |
| 5,986,422 | A | * | 11/1999 | Iwashita ............... | G05B 19/39 318/567 |
| 6,326,758 | B1 | * | 12/2001 | Discenzo ........... | G05B 23/0243 318/432 |
| 6,590,362 | B2 | * | 7/2003 | Parlos ..................... | H02P 29/02 318/799 |
| 6,651,012 | B1 | * | 11/2003 | Bechhoefer ............ | G01H 1/003 382/103 |
| 6,750,866 | B1 | * | 6/2004 | Anderson, III .......... | G06T 7/20 345/473 |

(Continued)

Primary Examiner — Bhavesh V Amin

(57) ABSTRACT

The present disclosure relates to a bus exception handling method of a robot including a main controller and a plurality of execution nodes electronically coupled to a bus of the robot. The main controller receives status information of an execution node of the robot from the execution node, determines whether the execution node is in an abnormal status based on the status information of the execution node. In response to determining the execution node is in the abnormal status, the main controller determines a degree of abnormity of the execution node, determines an operating instruction corresponding to the degree of abnormity, and sends the operating instruction to the execution node, the execution node executing the operating instruction. The present disclosure further provides a bus exception handling device.

17 Claims, 5 Drawing Sheets

(56) References Cited

U.S. PATENT DOCUMENTS

| | | | | |
|---|---|---|---|---|
| 7,826,984 B2* | 11/2010 | Sjostrand | B25J 9/1674 | 700/264 |
| 10,120,374 B2* | 11/2018 | Hosek | G05B 23/0221 | |
| 2003/0188304 A1* | 10/2003 | Goodman | G06F 8/656 | 717/171 |
| 2003/0221118 A1* | 11/2003 | Walker | B60R 25/042 | 713/193 |
| 2004/0103740 A1* | 6/2004 | Townsend | B25J 9/1612 | 74/490.01 |
| 2004/0162639 A1* | 8/2004 | Watanabe | B25J 9/1612 | 700/259 |
| 2004/0164696 A1* | 8/2004 | Yourlo | B41J 3/28 | 318/568.11 |
| 2005/0024688 A1* | 2/2005 | Inada | G03G 15/5016 | 358/400 |
| 2005/0046584 A1* | 3/2005 | Breed | B60C 11/24 | 340/13.31 |
| 2005/0248136 A1* | 11/2005 | Breed | B60R 21/0152 | 280/735 |
| 2007/0219666 A1* | 9/2007 | Filippov | B60T 7/22 | 700/245 |
| 2008/0215292 A1* | 9/2008 | Kato | G01M 13/021 | 702/183 |
| 2010/0063663 A1* | 3/2010 | Tolstedt | G05D 1/0231 | 701/23 |
| 2010/0063680 A1* | 3/2010 | Tolstedt | G05D 1/0214 | 701/41 |
| 2010/0101346 A1* | 4/2010 | Johnson | B25J 9/1641 | 74/405 |
| 2010/0116572 A1* | 5/2010 | Schmitt | B60G 3/28 | 180/65.51 |
| 2010/0324730 A1* | 12/2010 | Muller | H04L 12/40163 | 700/245 |
| 2012/0194146 A1* | 8/2012 | Longacre | G06F 1/266 | 323/234 |
| 2015/0025708 A1* | 1/2015 | Anderson | A61B 5/6804 | 701/2 |
| 2015/0100159 A1* | 4/2015 | Park | H02K 7/14 | 700/258 |
| 2015/0224845 A1* | 8/2015 | Anderson | B60G 17/019 | 701/37 |
| 2015/0316428 A1* | 11/2015 | Urata | F16H 57/01 | 310/68 B |
| 2015/0345611 A1* | 12/2015 | Arita | F16H 57/01 | 73/579 |
| 2015/0363109 A1* | 12/2015 | Frick | G06F 1/3221 | 711/112 |
| 2016/0309973 A1* | 10/2016 | Sheikh | A47L 11/282 | |
| 2017/0303825 A1* | 10/2017 | Martinson | A61B 5/112 | |
| 2018/0121312 A1* | 5/2018 | Sadowski | G06F 11/3452 | |
| 2018/0191555 A1* | 7/2018 | Xiong | H04L 41/0672 | |
| 2018/0317727 A1* | 11/2018 | Sheikh | A47L 11/282 | |

* cited by examiner

BUS EXCEPTION HANDING METHOD OF ROBOT AND BUS EXCEPTION HANDLING DEVICE

CROSS REFERENCE TO RELATED APPLICATIONS

This application claims priority to Chinese Patent Application No. 201611253336.4, filed Dec. 30, 2016, which is hereby incorporated by reference herein in its entirety.

BACKGROUND

1. Technical Field

The present disclosure relates to message processing field, and particularly to a bus exception handling method of a robot and a bus exception handling device.

2. Description of Related Art

Controller Area Network (CAN) bus is a serial communication protocol for real-time applications. It adopts twisted pair to transmit signals, which is one of the most widely used field buses in the world.

Nowadays robots are characterized by the attributes below: 1. motors of each of the execution nodes are directed to heavy loading, large currents, and frequently on and off, strong electric magnetic interfere source; 2. a lot of execution nodes; 3. a lot of nodes have to be controlled by a high speed and synchronous manner when performing various action; 4. demand toward high reliability due to human interactions; 5. facing more complex electric-magnetic environment when operating in a more dangerous environment in the future.

Based on above, bad environments and mission complexity lead to higher reliability toward data processing and communication system, and thus the CAN bus protocol has to be enhanced.

DETAILED DESCRIPTION

Figure 1:
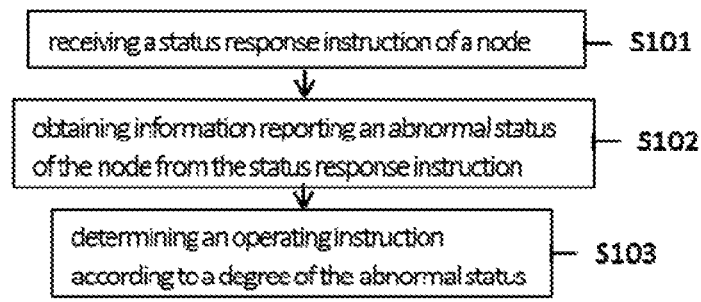
FIG. 1 is a flowchart illustrating a bus exception handling method of a robot in accordance with one embodiment of the present disclosure.

To clarify the purpose, technical solutions, and the advantages of the disclosure, embodiments of the invention will now be described more fully hereinafter with reference to the accompanying drawings, in which embodiments of the invention are shown. The figure and the embodiment described according to figure are only for illustration, and the present disclosure is not limited to these embodiments. It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

The disclosure provides a CAN2.0B bus protocol solution, for communication between a main controller of a robot and a plurality of execution nodes, i.e., servos. The solution relates to modify standard data frame and extended data frame described in the CAN2.0B, such that identifiers of arbitration field and fields of segments of data field in the standard data frame and the extended data frame are configured with new functions, to make CAN2.0B bus more suitable to robot control. The identifier field of the arbitration field in the standard data frame and the extended data frame is modified respectively as Table A-1 and Table A-2.

TABLE A-1

| | Definitions in identifier fields of arbitration field | | | |
|---|---|---|---|---|
| | ID10 | ID9 | ID8 | ... | ID0 |
| New definition | M1 | M0 | CH8 | ... | CH0 |

Wherein M1 and M0 indicates frame mode, and values of M1 and M0 may include 00, 01, 10, and 11;

CH8-CH0 indicate the communication channels of the nodes, which ranges from 0 to 511. When Channel=0, the data frame is a broadcast frame. All nodes may receive the broadcast frame.

TABLE A-2

| | ID 10 | ID 9 | ID 8 | ID 7 | ID 6 | ID 5 | ... | ID0 | EID 17 | EID 16 | EID 15 | ... | EID0 |
|---|---|---|---|---|---|---|---|---|---|---|---|---|---|
| Original definition | ID 10 | ID 9 | ID 8 | ID 7 | ID 6 | ID 5 | ... | ID0 | EID 17 | EID 16 | EID 15 | ... | EID0 |
| New definition | M1 | M0 | EM0 | N | END | I7 | ... | I2 | I1 | I0 | CH15 | ... | CH0 |

Wherein M1 and M0 indicate the frame mode, and the values of M1 and M0 may include 00, 01, 10, and 11;

Wherein EM0 indicates the extended frame mode. The values of the EM0 include 0 and 1. Definition of frame modes of extended frame is shown as Table A-11.

TABLE A-11

| M1 | M0 | EM0 | Description | Function |
|---|---|---|---|---|
| 0 | 0 | 0 | Node control instruction frame | Control node to execute action |

TABLE A-11-continued

| M1 | M0 | EM0 | Description | Function |
|---|---|---|---|---|
| 0 | 1 | 0 | Node return instruction frame | Return the collecting data of sensoring node or status of node |
| 0 | 0 | 1 | Uploading node serial code frame | Use extended data frame to transmit |
| 0 | 1 | 1 | Configuring channel frame | Configure data channel for nodes |
| 1 | 0 | 0 | Block control instruction frame | Sending terminal confirms whether the data has been correctly received by receiving terminal. |
| 1 | 1 | 0 | Block return instruction frame | |
| 1 | 0 | 1 | Output frame of block data | Determining a lost frame according to sequence number of the data frame, and instructions frame of block control and block return are adopted to confirm re-transmission |
| 1 | 1 | 1 | Input frame of block data | |

N is a reserved bit, which has not been configured temporarily.

END indicates whether the frame is the last frame during the data transmission. When END is equal to "0", the frame is not the last frame. When END is equal to "1", the frame is the last frame.

17-10 is an 8 bit self-increasing cycle code, indicating the sequence number of the data, which ranges from 0 to 255.

CH15-CH0 indicate communication channel of node. The value ranges from 0 to 65535. When the value of "Channel" equals to 0, the data frame is the broadcast frame. All nodes may receive the broadcast frame.

Data field in standard data frame and in extended data frame is modified as Table B-1.

TABLE B-1

| | Original data field definition | D0 | D1 | D2 | D3 | D4 | D5 | D6 | D7 |
|---|---|---|---|---|---|---|---|---|---|
| New data field definition | Node control instruction frame | CMD | D0 | D1 | D2 | D3 | D4 | D5 | D6 |
| | Node return instruction frame | CMD | D0 | D1 | D2 | D3 | D4 | D5 | D6 |
| | Uploading node serial code frame | D0 | D1 | D2 | D3 | D4 | D5 | D6 | D7 |
| | Configuring channel frame | D0 | D1 | D2 | D3 | D4 | D5 | D6 | D7 |
| | Block control instruction frame | CMD | D0 | D1 | D2 | D3 | D4 | D5 | D6 |
| | Block return instruction frame | CMD | D0 | D1 | D2 | D3 | D4 | D5 | D6 |
| | Output frame of block data | D0 | D1 | D2 | D3 | D4 | D5 | D6 | D7 |
| | Input frame of block data | D0 | D1 | D2 | D3 | D4 | D5 | D6 | D7 |

Wherein CMD relates to secondary instruction. Nodes may conduct their own instruction set, see Table B-2.

D0~D6 relate to data carried by secondary instruction.

D0~D7 relate to data carried by each frame during data transmission. The 8 bits are configured to enhance transmission efficiency.

TABLE B-2

| CMD | Instruction message | Descriptions |
|---|---|---|
| F0 | First reset request instruction | Main controller requests node to reset parameters to predetermined values. |
| EF | First reset response instruction | Node reports to main controller about status of parameter reset. |

TABLE B-2-continued

| CMD | Instruction message | Descriptions |
|---|---|---|
| EE | Second reset request instruction | Main controller requests node to reset. |
| ED | Second reset response instruction | Confirming with main controller about node reset. |
| EC | Status request instruction | Querying node status. |
| EB | Status response instruction | Reporting node status. |

FIG. 1 is a flowchart illustrating a bus exception handling method of a robot in accordance with one embodiment of the present disclosure.

As shown in FIG. 1, the method includes step S101: receiving a status response instruction of a node; step S102: obtaining information reporting an abnormal status of the node from the status response instruction; step S103: determining an operating instruction according to a degree of the abnormal status.

In one embodiment, in step S101, main controller receives the status response instruction of the node. The node relates to any one of the nodes other than the main controller. The node reports the status response instruction to the main controller upon detecting an abnormal status. The main controller is configured to receive the status response instruction of the node. In step S102, the main controller analyzes the received status response instruction according to a predetermined protocol, and obtains the information of the abnormal status of the node from the status response instruction. In step S103, the main controller determines the operating instruction according to the degree of the abnormal status. The abnormal status may be classified into a plurality of degrees. The main controller determines the corresponding operating instructions.

In the embodiment, the method for detecting abnormal system bus can execute the corresponding operating instruction according to different abnormal status, therefore realizing the effective control of each node.

Figure 2:
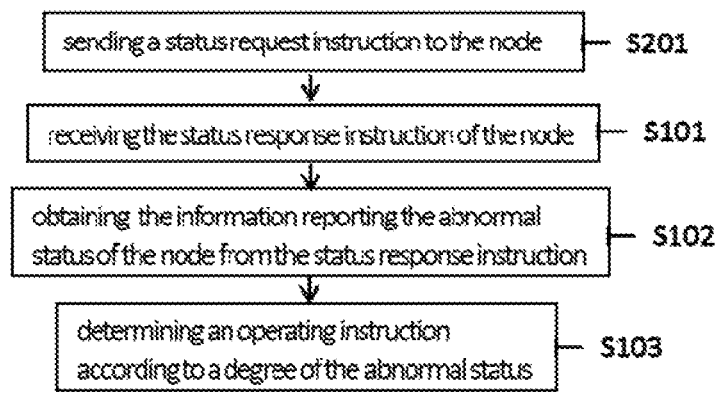
FIG. 2 is a flowchart illustrating the bus exception handling method of the robot in accordance with another embodiment of the present disclosure.

FIG. 2 is a flowchart illustrating the bus exception handling method of the robot in accordance with another embodiment of the present disclosure.

For sake of convenience of description, the same configuration between the previous embodiment and this embodiment is no longer detailed described, but focuses only on the difference between the previous embodiment and the embodiment. In FIG. 2, the step which is the same as or similar to the previous embodiment use the same reference numerals.

As shown in FIG. 2, the method includes step S201: sending a status request instruction to the node; step S101: receiving the status response instruction of the node; step S102: obtaining information reporting the abnormal status of the node from the status response instruction; and step S103: determining the operating instruction according to the degree of the abnormal status.

In one embodiment, in step S201, the main controller sends the status request instruction to the node to request the node to report the current status. The main controller sends the status request instruction to the node via a broadcast frame or an unicast frame.

The status request instructions are shown as Table 1

TABLE 1

| Bit | Description | The value range | Function |
|---|---|---|---|
| 0 | CMD instruction | 0XEC | Main controller requests node to report current status. When main controller resets abnormally, main controller requests all nodes to re-register node. |

In step S101, after the node receives the status request instruction, the node sends the state response instruction to the main controller, wherein the main controller receives the status response instruction including the status of the node.

The status response instructions are shown in Table 2.

TABLE 2

| Bit | Description | The value range | Function |
|---|---|---|---|
| 0 | CMD instruction | 0XEB | Node reports current status to main controller |
| 1 | Status code | 0-4 | Abnormal statuses are defined by each node<br>0: Normal<br>1: abnormal bus<br>2: abnormal initialization<br>3: limited function<br>4: wrong function |

In step S102, the main controller obtains the information reporting the abnormal status of the node from the status response instruction. Alternatively, the degrees of the abnormal status of the node may include a first degree, a second degree, and a third degree. In step S103, the main controller determines the operating instruction according to the degree of the abnormal status of the node.

As shown in Table 2, the value of the status code is configured to be four upon detecting the wrong function, the value of the status code is configured to be three upon detecting the limited function, the value of the status code is configured to be two upon detecting the abnormal initialization; the value of the status code is configured to be upon determining the abnormal bus; and the value of the status code is configured to be zero upon determining the node is in its normal operation.

When the main controller analyzes and obtains the value of the status code equal to four, which is directed to a first degree, the main controller determines that the operating instruction is directed to the turn-off instruction. In this scenario, the robot needs to be shut down so as to conduct the maintenance immediately. When the main controller analyzes and obtains the value of the status code equal to three, which is directed to a second degree, the main controller determines that the operating instruction is directed to the off-line instruction. In this scenario, the node needs to be maintained. Wherein when the off-line instruction is executed, the node only replies the request instruction of on-line of the node. When the node executes the off-line instruction, the firmware is still operated, but the node is silent to reply requests except the request instruction of on-line of the node. When the main controller analyzes and obtains the value of the status code equal to two or one, which is directed to a third degree, the main controller determines that the operating instruction is directed to the reset instruction. In this scenario, the node needs to be reset.

Alternatively, when the value of the status code is equal to two, the reset instruction is directed to a first reset request instruction, and the node resets the parameters to the initial value. When the value of the status code is equal to one, the reset instruction is directed to a second reset instruction, and the node restarts and conducts initial process.

Alternatively, when the value of the status code is equal to one, the reset instruction is directed to the first reset request instruction, and the node resets the parameters to the initial value. When the value of the status code is equal to two, the reset instruction is directed to the second reset request instruction, and the node restarts and conducts initial process.

Alternatively, when the value of the status code is equal to one or two, the reset instruction is directed to the first reset request instruction, and the node resets the parameters to the initial value.

Alternative, when the value of the status code is equal to one or two, the reset instruction is directed to the second reset request instruction, and the node restarts and conducts initial process.

When the main controller analyzes and obtains the value of the status code equal to zero, the main controller determines that the operating instruction is directed to a processing instruction. When the node is determined to be normal, the node continues to its operation.

It is noted that the initial value of the parameter of the node can be set. The parameters of the nodes may use the default values of the node as the initial values of the parameters of the node.

In another embodiment, when the value of the status code is equal to two, which corresponds to the third degree, the operating instruction may be directed to the first reset request instruction, and the node resets the parameters to the initial value. When the value of the status code is equal to one, which corresponds to the fourth degree, the operating instruction is directed to the second reset request instruction, and the node restarts and conducts initial process.

In another embodiment, when the value of the status code is equal to one, which corresponds to the third degree, the operating instruction may be directed to the first reset request instruction, and the node resets the parameters to the initial value. When the value of the status code is equal to two, alternatively which corresponds to the fourth degree, the operating instruction is directed to the second reset request instruction, and the node restarts and conducts initial process.

First reset request instruction is shown in Table 3.

TABLE 3

| Bit | Description | The value range | Function |
|---|---|---|---|
| 0 | CMD instruction | 0XF0 | Main controller request node to reset parameter as the initial values |

Second reset request instruction is shown in Table 4.

TABLE 4

| Bit | Description | The value range | Function |
|---|---|---|---|
| 0 | CMD instruction | 0XEF | Main controller request node to restart |

In one scenario, the main controller of the robot requests the node 10 to reset the parameters as the initial values, and the main controller sends the first reset instruction to the node 10. The corresponding fields in the message are: MI M0 EM0=100, channel=10, CMD=0XF0.

The node 10 sends the first reset response instruction to the main controller, and resets the parameters as the initial values. The corresponding fields in the message are: MI M0 EM0=110, channel=10, CMD=0XEF, and D1=reply the execution result.

Afterward, the parameters are reset to be the same with the initial values.

Response of first reset instruction is shown in Table 5.

TABLE 5

| Bit | Description | The value range | Function |
|---|---|---|---|
| 0 | CMD instruction | 0XEF | Node reports main controller whether to reset parameters as initial values or not |
| 1 | Reply to resetting result | 0-2 | 0: failure to restore initial value<br>1: succeed in restoring to initial value, and new parameters are valid<br>2: succeed in restoring to initial value, and new parameters will be valid after reboot |

In one scenario, the main controller of the robot requests the node 10 to reset the parameters as the initial values, and the main controller sends the second reset request instruction to the node 10. The corresponding fields in the message are: MI M0 EM0=100, channel=10, CMD=0XC0.

The node 10 sends the second reset response instruction to the main controller, and resets the parameters as the initial values. The corresponding fields in the message are: MI M0 EM0=110, channel=10, CMD=0XED.

Afterward, the resetting for the parameters as the initial values is completed.

First reset response instruction is shown in Table 6.

TABLE 6

| Bit | Description | The value range | Function |
|---|---|---|---|
| 0 | CMD instruction | 0XED | Node reports main controller ready to restart |

In one embodiment, the method further includes sending off-line instruction according to the status of the node after the node executes the reset request instruction. The step of sending the off-line instruction includes: receiving the status response instruction of the node; sending the off-line instruction to the node when the node is a setting status, wherein the setting status includes an abnormal state or the degree of the abnormal state is directed to the second degree. That is, after the node executes the reset request instruction, the node sends the status response instruction to the main controller upon detecting the abnormal state. The main controller obtains the abnormal status information of the node from the status response instruction, determines that the problem of the node still exist, and sends the off-line instruction to the node.

In the embodiment, the method for detecting abnormal system bus can execute the corresponding operating instruction according to different abnormal status, therefore realizing the effective control of each node of robot.

Figure 3:
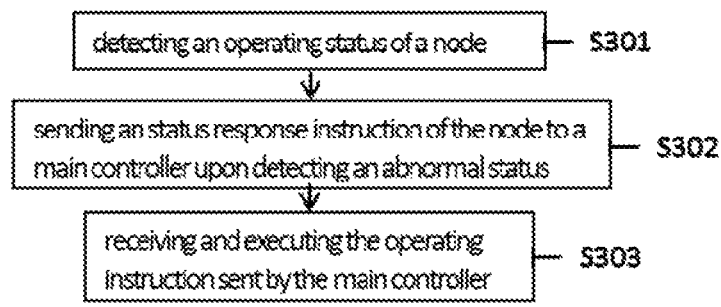
FIG. 3 is a flowchart illustrating the bus exception handling method of the robot in accordance with another embodiment of the present disclosure.

FIG. 3 is a flowchart illustrating the bus exception handling method of the robot in accordance with another embodiment of the present disclosure.

For sake of convenience of description, the same configuration between the previous embodiment and this embodiment is no longer detailed described, but focuses only on the difference between the previous embodiment and the embodiment.

As shown in FIG. 3, the method includes step S301: detecting the operating status of the node, step S302: sending the state response instruction of the node to the main controller upon detecting an abnormal status, wherein the status response instruction includes the information of the abnormal status, and step S303: receiving and executing the operating instruction sent by the main controller.

In one embodiment, the node detects the operating status of the node. The node sends the status response instruction to the main controller upon detecting the abnormal status of the node. The node reports the abnormal status of the node, and receives the operating instruction sent by the main controller and executes the corresponding instruction.

In another embodiment, after the node executes the operating instruction, the node sends the status response instruction to the main controller again if the abnormal status still exists, and the node waits for the off-line instruction sent by the main controller.

In the embodiment, the method for detecting abnormal system bus can execute the corresponding operating instruction according to different abnormal status, therefore realizing the effective control of each node of robot.

In one embodiment, the method for detecting abnormal system bus includes receiving the status response instruction of the node; obtaining the information reporting the abnormal status of the node from the status response instruction; and determining the operating instruction according to the degree of the abnormal status of the node.

In one embodiment, the degree of the abnormal status information is directed to the first degree, the operating instruction is the turn-off instruction configured to be executed by the main controller.

In one embodiment, the degree of the abnormal status is directed to the second degree, and the operating instruction is the off-line instruction configured to be executed by the node.

In one embodiment, the degree of the abnormal status is directed to the third degree, the operating instruction is the reset instruction or the off-line instruction. In an example, the determination of the operating instruction is based on the time of receiving the status response instruction of the node. In an example, the time of receiving the status response instruction of the node has a relation to the execution of the operating instruction of the node. In an example, if the main controller receives the status response instruction of the node before the node executes the operating instruction, the operating instruction is the off-line instruction; if the main controller receives the status response instruction of the node before the node executes the operating instruction, the operating instruction is the off-line instruction.

It can be seen that the choices of the operating instruction are not only based on the degree of the abnormal state, but also the timing of receiving the status response instruction of the node. The operating instructions are different between the different timing of the degrees of the abnormal state, so as to realize the precise control of each node of the robot. The timing of receiving the status response instruction of the node has the relation to the execution of the operating instruction of the node, so as to realize the precise control of each node of the robot. It can be seen that the embodiment provides a solution to control precisely each node of the robot.

In one embodiment, the degree of the abnormal status is directed to the third degree, the operating instruction is the reset instruction configured to be executed by the node.

In one embodiment, the method for detecting abnormal system bus further includes sending the off-line instruction according the state of the node after the node executes the reset instruction; receiving the status response instruction of the node; and sending the off-line instruction to the node if the degree of the abnormal status of the node is directed to the fourth degree or the third degree. It can be seen that the corresponding operating instructions are different if the degree of the abnormal state is the same but is at different stage, so as to realize the precise control of the nodes.

In one embodiment, the reset instruction includes the first reset instruction or the second reset instruction. Alternatively, the first reset instruction is configured to reset the parameters of the node as the initial values, and the second reset instruction is configured to restart and initiate the node. It can be seen that the corresponding operating instruction can be slightly different even if the same degree of the abnormal state, so as to conduct the precise control for the node.

In one embodiment, the method for detecting abnormal system bus further includes sending the status request instruction to the node via the broadcast frame or the unicast frame before receiving the status response instruction of the node.

In one embodiment, the method for detecting abnormal system bus includes detecting the operating state of the node; sending the status response instruction of the node to the main controller upon detecting the abnormal status of the node, wherein the status response instruction includes information reporting the abnormal status; receiving and executing the operating instruction sent by the main controller. Alternatively, the operating instruction includes the reset instruction or the off-line instruction.

In one embodiment, the method for abnormal system bus further includes sending repeatedly the status response instruction of the node to the main controller if the status of the node is still abnormal after the node executes the operating instruction sent by the main controller, wherein the operating instruction includes the off-line instruction or the reset instruction. The reset instruction includes the first reset instruction or the second reset instruction.

Wherein when the off-line instruction is executed, the node only responses the request of the on-line instruction of the node. When the node executes the off-line instruction, the firmware is still operating, but the node does not response the request except the request of the on-line instruction.

Wherein the step of executing the first reset instruction includes resetting the parameters of the node as the initial values, and the step of executing the second reset instruction includes restarting the node and initiates the node.

Figure 4:
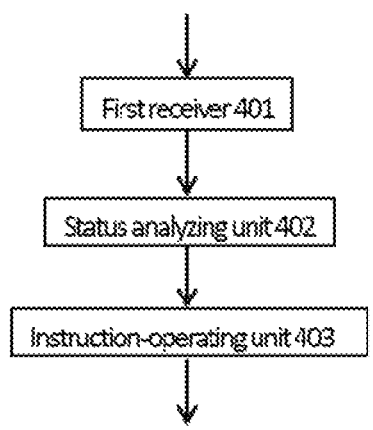
FIG. 4 is a schematic view of a robot controller in accordance with one embodiment of the present disclosure.

FIG. 4 is a flowchart illustrating a robot controller in accordance with one embodiment of the present disclosure.

In the embodiment, the robot controller includes a first receiver 401, a status analyzing unit 402, and an instruction-operating unit 403.

The first receiver 401 is configured to receive the status response instruction of the node.

The status analyzing unit 402 is configured to obtain the information reporting the abnormal status of the node from the status response instruction.

The instruction-operating unit 403 is configured to determine the operating instruction according to the degree of the abnormal status of the node. The degree of the abnormal status includes the third degree. The operating instruction is the request of the reset instruction when the degree of the abnormal status is directed to the third degree, and the request of the reset instruction is configured to be executed by the node.

In one embodiment, the robot controller further includes a first transmitter. The first transmitter is configured to send the off-line instruction according to the status after the node executes the request of the reset instruction.

In the embodiment, the robot controller for buses can realize the control of each node of the robot upon detecting the abnormal status.

Figure 5:
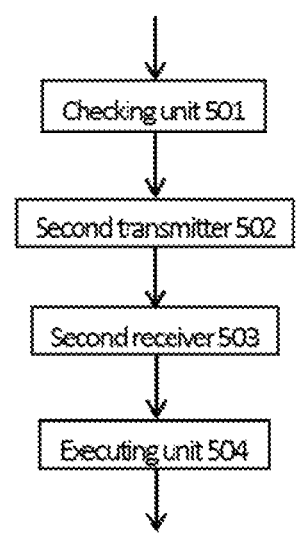
FIG. 5 is a schematic view of an execution node in accordance with another embodiment of the present disclosure.

FIG. 5 is a flowchart illustrating an execution node in accordance with one embodiment of the present disclosure.

In the embodiment, the execution node includes a checking unit 501, a second transmitter 502, a second receiver 503 and an executing unit 504.

The checking unit 501 is configured to detect the operating status of the node.

The second transmitter 502 is configured to send the status response instruction of the node to the main controller upon detecting an abnormality of the operating status of the node, wherein the status response instruction includes the information reporting the abnormal status.

The second receiver 503 is configured to receive the operating instruction sent by the main controller.

The executing unit 504 is configured to execute the operating instruction.

In the embodiment, the robot controller for bus can realize the control of each node of the robot upon detecting the abnormal status.

In one embodiment, the robot controller includes the first receiver configured to receive the status response instruction of the state, the status analyzing unit configured to obtain the abnormal status information of the state from the status response instruction, and the instruction-operating unit configured to determine the operating instruction according to the degree of the abnormal status of the node obtained by the status analyzing unit.

In one embodiment, the degree of the abnormal status information is directed to the first degree, the operating instruction is the turn-off instruction configured to be executed by the main controller.

In one embodiment, the degree of the abnormal status is directed to the second degree, the operating instruction is the off-line instruction configured to be executed by the node.

In one embodiment, the degree of the abnormal status is directed to the third degree, the operating instruction is the reset instruction or the off-line instruction. Alternatively, the determination of the operating instruction is based on the time of receiving the status response instruction of the node. Alternatively, the time of receiving the status response instruction of the node has a relation to the execution of the operating instruction of the node. Alternatively, if the main controller receives the status response instruction of the node before the node executes the operating instruction, the operating instruction is the off-line instruction; if the main controller receives the status response instruction of the node before the node executes the operating instruction, the operating instruction is the off-line instruction, wherein the reset instruction or the off-line instruction is executed by the node.

In one embodiment, the reset instruction includes the first reset instruction or the second reset instruction. Alternatively, the first reset instruction is configured to reset the parameters of the node as the initial values, and the second reset instruction is configured to restart and initiate the node.

In one embodiment, the robot controller further includes the first transmitter configured to send the operating instruction to the node, wherein the first transmitter is further configured to send the status request instruction to the node.

In one embodiment, the node includes the checking unit configured to detect the operating status of the node; the second transmitter configured to send the status response instruction of the node to the main controller upon detecting the abnormality of the operating status; the second receiver configured to receive the operating instruction sent by the main controller; and the executing unit configured to execute the operating instruction, wherein the operating instruction includes the offline instruction or the reset instruction. The reset instruction includes the first reset instruction or the second reset instruction. Wherein when the offline instruction is executed, the node only responses the on-line request instruction of the node. When the node executes the offline instruction, the firmware is still operating, but the node does not response the request except the request of the on-line instruction. Wherein the step of executing the first reset instruction includes resetting the parameters of the node as the initial values, and the step of executing the second reset instruction includes restarting the node and initiates the node. Alternatively, the checking unit periodically checks the operating status of the node, or the checking unit detects the operating status upon receiving the request sent by the main controller. Alternatively, the operating instruction includes the reset instruction or the offline instruction.

The technical effect of the robot controller in the embodiments is described as above, and not described in detail here.

In an example, the present disclosure further provides non-transitory computer readable medium, for example, memory including the instructions that can be executed by the processor to utilize the above method. The non-transitory computer readable medium may be a read only memory (ROM), a random access memory (RAM), magnetic tapes or optical data storage devices.

A person skilled in the art should understand that the disclosed combinations of various exemplary logical blocks, modules, circuits, and algorithm steps described in the present disclosure may be implemented as electronic hardware, computer software or a combination of both. In order to clearly describe such interchangeability of the hardware and software, functions of the various exemplary components, blocks, modules, circuits, and algorithm steps have been generally described thereof. Whether such functions are implemented as software or hardware depends on the specific application and the design restrictions applied to the entire system. A person skilled in the art may implement the above described functions in various manners in combination with the specific applications. However, such implementation decisions shall not be construed as causing a departure from the scope of the present disclosure.

While the foregoing disclosure illustrates exemplary embodiments of the present disclosure, it should be noted that without departing from the scope defined by the claims of the disclosed premise, various modifications and changes can be made. A method according to an embodiment of the disclosure described herein required functions, steps and/or actions need not be performed in any particular order. In addition, although elements of the present disclosure may be described or claimed in the individual form, but they can also be envisaged more unless explicitly restricted to the singular.

The above description is merely the embodiments in the present disclosure, the claim is not limited to the description thereby. The equivalent structure or changing of the process of the content of the description and the figures, or to implement to other technical field directly or indirectly should be included in the claim.

The CAN protocol relates to a point-to-multipoint and serial communication protocol for real-time applications. The CAN adopts twisted pair to transmit signals, which is one of the most widely used field buses in the world. The CAN protocol is robust, and thus may be widely used in the field of automation and other applications.

What is claimed is:

1. A bus exception handling method of a robot comprising a main controller and a plurality of execution nodes electronically coupled to a bus of the robot, the method comprising:
   receiving, by the main controller, status information of an execution node of the robot, wherein the status information of the execution node is sent from the execution node to the main controller via the bus, and wherein the status information of the execution node is determined by the execution node;
   determining, by the main controller, whether the execution node is in an abnormal status based on the status information of the execution node;
   in response to determining the execution node is in the abnormal status, determining, by the main controller, a degree of abnormity of the execution node; and
   determining, by the main controller, an operating instruction corresponding to the degree of abnormity, and sending the operating instruction to the execution node, the execution node executing the operating instruction;
   wherein the operating instruction is a turn-off instruction, in response to the degree of abnormity of the execution node being a first level;
   wherein the operating instruction is an offline instruction, in response to the degree of abnormity of the execution node being a second level; and
   wherein the operating instruction is a reset instruction, in response to the degree of abnormity of the execution node being a third level, wherein the second level is a higher degree of abnormity of the execution node and the third level is a higher degree of abnormity than the second level.

2. The method as claimed in claim 1, wherein the method further comprises:
   sending, by the main controller, the offline instruction to the execution node, according to the status information of the execution node received after the reset instruction is performed by the execution node.

3. The method as claimed in claim 2, wherein the step of sending, by the main controller, the offline instruction to the execution node, according to the status information of the execution node received after the reset instruction is performed by the execution node comprises:
   sending, by the main controller, the offline instruction to the execution node, in response to the status information of the execution node received after the reset instruction is performed by the execution node, wherein the status information of the execution node received after the reset instruction is performed by the execution node indicates that the execution node is in a setting status, and wherein the setting status comprises the abnormal state or a status corresponding to the second level.

4. The method as claimed in claim 3, wherein the method further comprises:

sending, by the main controller, a status response instruction request to the execution node, before the step of receiving, by the main controller, the status information of the execution node;

wherein the status response instruction request is defined to request the execution node to report the status information of the execution node.

5. The method as claimed in claim 1, wherein the status information of the execution node is carried within a data frame of a controller area network bus protocol, the data frame comprises a data field, the data field comprises a command field comprising a status response instruction, and a value of a status code of the status response instruction is configured to indicate the status information of the execution node.

6. The method as claimed in claim 5, wherein the value of the status code is configured to be 4, if an error occurred in a function of the execution node is detected;

the value of the status code is configured to be 3, if the function of the execution node is detected to be restricted, the value of the status code is configured to be 2, if detecting an abnormal initialization;

the value of the status code is configured to be 1, if determining an abnormal bus; and the value of the status code is configured to be 0, if determining the execution node is in its normal operation;

wherein if the value of the status code is equal to 4, the degree of abnormality is the first level, if the value of the status code is equal to 3, the degree of abnormality is the second level, and if the value of the status code is equal to 2 or 1, the degree of abnormality is the third level.

7. The method as claimed in claim 1, wherein the execution node is a servo.

8. A bus exception handling method of a robot comprising a main controller and a plurality of execution nodes electronically coupled to a bus of the robot, the method comprising:

determining, by an execution node of the robot, whether the execution node is in an abnormal operating status;

in response to determining the execution node is in the abnormal operating status, sending, by the execution node, abnormal operating status information of the execution node to the main controller; and receiving, by the execution node, an operating instruction sent from the main controller, and executing the operating instruction;

wherein the operating instruction is corresponding to a degree of abnormality of the execution node; and wherein the degree of abnormality of the execution node is determined by the main controller based on the abnormal operating status information, and is corresponding to the abnormal operating status;

wherein the method further comprises:

resending, by the execution node, the abnormal operating status information of the execution node to the main controller, in response to determining the operating status of the execution node is in the abnormal operating status, after the operating instruction is executed by the execution node;

wherein the operating instruction is a turn-off instruction, in response to the degree of abnormality of the execution node being a first level; wherein the operating instruction is an offline instruction, in response to the degree of abnormality of the execution node being a second level; and wherein the operating instruction is a reset instruction, in response to the degree of abnormality of the execution node being a third level, wherein the second level is a higher degree of abnormality of the execution node and the third level is a higher degree of abnormality than the second level.

9. The method as claimed in claim 8, wherein the method further comprises:

receiving, by the execution node, the offline instruction sent from the main controller, wherein the offline instruction is sent by the main controller according to the abnormal operating status information of the execution node received after the reset instruction is executed by the execution node.

10. The method as claimed in claim 8, wherein the abnormal operating status information of the execution node is carried within a data frame of a controller area network bus protocol, the data frame comprises a data field, the data field comprises a command field which comprises a status response instruction, and a value of a status code of the status response instruction is configured to indicate the abnormal operating status information of the execution node.

11. The method as claimed in claim 10, wherein the value of the status code is configured to be 4, if an error occurred in a function of the execution node is detected;

the value of the status code is configured to be 3, if the function of the execution node is detected to be restricted, the value of the status code is configured to be 2, if detecting an abnormal initialization;

the value of the status code is configured to be 1, if determining an abnormal bus; and the value of the status code is configured to be 0, if determining the execution node is in its normal operation;

wherein if the value of the status code is equal to 4, the degree of abnormality is the first level, if the value of the status code is equal to 3, the degree of abnormality is the second level, and if the value of the status code is equal to 2 or 1, the degree of abnormality is the third level.

12. The method as claimed in claim 8, wherein the execution node is a servo.

13. A bus exception handling device, the device comprising:

a bus;

one or more processors;

a plurality of execution nodes;

a memory; and one or more programs;

wherein the one or more processors and a plurality of execution nodes are coupled to the bus, the one or more programs are stored in the memory and are executed by the one or more processors, and the one or more programs is configured for:

receiving status information of an execution node of the device, wherein the status information of the execution node is sent from the execution node to the one or more processors via the bus, and wherein the status information of the execution node is determined by the execution node;

determining whether the execution node is in an abnormal status based on the status information of the execution node;

in response to determining the execution node is in the abnormal status, determining, by the main controller, a degree of abnormity of the execution node;

determining an operating instruction corresponding to the degree of abnormity, and sending the operating instruction to the execution node, the execution node executing the operating instruction, wherein the operating instruction is an offline instruction, in response to the degree of abnormity being a second level, and the operating instruction is a reset instruction, in response to the degree of abnormity being a third level; and sending the offline instruction to the execution node, according to the status information of the execution node received after the reset instruction is performed by the execution node.

14. The device as claimed in claim 13, wherein the status information of the execution node received after the reset instruction is performed by the execution node indicates that the execution node is in a setting status, and wherein the setting status comprises the abnormal state or a status corresponding to the second level.

15. The device as claimed in claim 13, wherein the one or more programs is further configured for:

sending a status response instruction request to the execution node, before receiving the status information of the execution node;

wherein the status response instruction request is defined to request the execution node to report the status information of the execution node.

16. The device as claimed in claim 13, wherein the status information of the execution node is carried within a data frame of a controller area network bus protocol, the data frame comprises a data field, the data field comprises a command field comprising a status response instruction, and a value of a status code of the status response instruction is configured to indicate the status information of the execution node;

wherein the value of the status code is configured to be 4, if an error occurred in a function of the execution node is detected; the value of the status code is configured to be 3, if the function of the execution node is detected to be restricted; the value of the status code is configured to be 2, if detecting an abnormal initialization; the value of the status code is configured to be 1, if determining an abnormal bus; and the value of the status code is configured to be 0, if determining the execution node is in its normal operation;

wherein if the value of the status code is equal to 4, the degree of abnormity is the first level, if the value of the status code is equal to 3, the degree of abnormity is the second level, and if the value of the status code is equal to 2 or 1, the degree of abnormity is the third level.

17. The device as claimed in claim 14, wherein the execution node is a servo, and the operating instruction is a turn-off instruction, in response to the degree of abnormity being a first level.

* * * * *